United States Patent [19]

Imanishi

[11] Patent Number: 5,100,113

[45] Date of Patent: Mar. 31, 1992

[54] PNEUMATIC DIE CUSHION EQUIPMENT

[75] Inventor: Shozo Imanishi, Sagamihara, Japan

[73] Assignee: Aida Engineering Co., Ltd., Sagamihara, Japan

[21] Appl. No.: 420,160

[22] Filed: Oct. 6, 1989

[30] Foreign Application Priority Data

Oct. 18, 1988 [JP] Japan ................................. 63-262215
Oct. 21, 1988 [JP] Japan ................................. 63-265620

[51] Int. Cl.⁵ ............................................. B21D 24/02
[52] U.S. Cl. ................................. 267/119; 267/126; 267/130
[58] Field of Search ............... 207/64.13, 64.15, 64.16, 207/75, 118, 119, 124, 130, 126, 127; 188/318, 319, 244

[56] References Cited

U.S. PATENT DOCUMENTS

| | | | |
|---|---|---|---|
| 3,593,980 | 7/1971 | McHenry | 267/126 |
| 3,807,678 | 4/1974 | Karnopp et al. | 267/126 |
| 3,962,895 | 6/1976 | Rydell | 267/119 |
| 4,229,965 | 10/1980 | Spacek et al. | 267/119 |
| 4,774,865 | 10/1988 | Wallis | 267/119 |
| 4,860,571 | 8/1989 | Smedberg et al. | 267/130 X |

FOREIGN PATENT DOCUMENTS

| | | |
|---|---|---|
| 0284903 | 10/1988 | European Pat. Off. . |
| 147928 | 4/1981 | Fed. Rep. of Germany . |
| 2386414 | 11/1978 | France . |
| 0605930 | 2/1985 | Japan . |
| 0616968 | 3/1986 | Japan . |
| 63-24770 | 5/1988 | Japan . |
| 2140871 | 12/1984 | United Kingdom . |

Primary Examiner—Matthew C. Graham

[57] ABSTRACT

A closed type cylinder unit, instead of the open-to-atmosphere type cylinder unit of conventional equipment forms part of the die cushion apparatus. Based on the principle that the die cushion capability by the closed type cylinder unit is determined by the differential pressure between the lower chamber pressure and the upper chamber pressure, the differential pressure is controlled in such manner that the lower chamber and the upper chamber communicate with each other through a check valve, which is opened when the differential pressure exceeds a preset differential pressure value. As the upper and lower chambers communicate through a shut-off valve, which hinders the excessive increase of the upper chamber pressure when the piston goes up. Further, the form of the check valve is changed for conveniently changing and adjusting the die cushion apparatus during press fabrication.

18 Claims, 6 Drawing Sheets

PNEUMATIC DIE CUSHION EQUIPMENT

BACKGROUND OF THE INVENTION

The present invention relates to a pneumatic die cushion apparatus.

A pneumatic die cushion apparatus of conventional type is shown in FIG. 7. In the figure, reference numeral 1 designates an air cylinder, which is separated by a piston 2 into an upper chamber 1U and a lower chamber 1L. The upper chamber 1U is opened to the atmospheric air through an opening 5. Reference numeral 4 designates a wear plate fixed on the upper end of a piston rod 3 and receives the cushion pin (not shown). Reference numeral 6 designates a buffer tank, and this communicates with the lower chamber 1L through a connection pipe 7.

In a die cushion apparatus of such structure, the pressure Pu in the upper chamber is equal to the atmospheric pressure and is constant because the upper chamber 1U is opened to the atmospheric air. Consequently, the die cushion capability or force F is obtained from the pressure Pl in the lower chamber and the sectional area Al of the piston 2: $F = P \cdot Al$. However, because the pressure Pl in the lower chamber is increased when the piston 2 moves down, i.e. when the volume of the lower chamber 1L is decreased, the die cushion capability increases. On the other hand, die cushion capability or force, i.e. the proper blank holding pressure (F) necessary for the press fabrication, is determined by the quality of the material, and it is inconvenient when the force increases too much.

For this reason, the conventional type apparatus is provided with a buffer tank, which has a volume 5-8 times as large as the volume of the cylinder 1. This avoids an extreme increase of the die cushion force F by enlarging the apparent or effective volume of the lower chamber 1L.

Therefore, as shown for the sake of comparison with the present invention in FIG. 2 by the two-dot chain line, the necessary blank holding pressure Fp can be obtained as soon as the piston 2 begins to go down from the upper limit UL if the initial pressure P1S necessary for obtaining the die cushion capability (the proper blank holding pressure) Fp is established in the lower chamber 1L and the buffer tank 6. Thereafter, the pressure gradually increases as shown by the one-dot chain line in FIG. 2. Thus, the die cushion capability when the piston 2 reaches the lower limit LL is Fpe.

As described above, the die cushion apparatus of the conventional type is constructed in such manner as to increase the effective volume of the lower chamber 1L by introducing a large-capacity buffer tank and to obtain the proper blank holding pressure at a constant level.

With the introduction of large-size presses and the automated equipment such as transfer presses, and with the increasing demand for higher product quality and productivity, the following problems arise:

(1) The space required for the buffer tank 6 is large and not very economical, and this also hinders the installation of a large-size press and the layout of the other functional components. Particularly, it causes significant problems in a transfer press equipped with a large number of dies.

(2) Much time is required for establishing the initial pressure P1S or for an adjustment to increase the die cushion capability. This has the drawback that, even if the other initial conditions can be met within short time, the press cannot be operated quickly. On the other hand, to establish the initial pressure P1S quickly, a high-pressure large-capacity compressor must be installed, and this is disadvantageous due to the expense and the space requirements.

Also, for providing an adjustment to decrease the die cushion capability, a quick-acting large-size exhaust valve must be installed and this also causes an economic burden. Since a large quantity of high pressure air must be released to the atmosphere air or supplied for each adjustment, this leads to an additional economic disadvantage.

(3) Further, even when the disadvantages of (1) and (2) above are accepted, it is impossible to increase the capacity of the buffer tank 6 infinitely. Therefore, the die cushion capability inevitably increases more or less as the piston 2 goes down.

However, the higher quality and the cost reduction are in demand these days, and the increase of the die cushion capability itself is no longer acceptable in many fields of the fabrication industry.

(4) In addition the materials for press fabrication have become increasingly complicated and sophisticated from the viewpoints of cost reduction or the quality improvement of the end products. In some cases, defective products may be produced depending upon the forms of the materials or fabrication unless the die cushion for press fabrication is changed adequately according to the circumstances. In other words, if the die cushion capability can be properly changed and adjusted during the press fabrication, a wide variety of products can be fabricated at high efficiency, and extensive cost reduction along with the production of high quality products can be actualized. However, this cannot be accomplished by conventional pneumatic die cushion equipment.

SUMMARY OF THE INVENTION

The object of the present invention is to offer a small and compact pneumatic die cushion apparatus with simple structure, easy maneuverability and low cost, which can eliminate the large capacity buffer tank, the large-size compressor, the quick-acting large-size exhaust valve, and related components, and can maintain the die cushion capability at a constant level.

To solve these problems, the apparatus according to the present invention consists of a closed type cylinder unit, which is to replace the open-to-atmosphere type cylinder of conventional equipment. The new apparatus is also based on the principle that the die cushion capability or force by the closed type cylinder is determined by the differential pressure between the lower chamber pressure and the upper chamber pressure, and the differential pressure is controlled by providing communication between the lower and upper chambers.

In the actual detail, the lower chamber and the upper chamber having the cylinder of the piston therebetween communicate with each other through a check valve, which is opened when the differential pressure between the lower chamber pressure and the upper chamber pressure, changing with the downward movement of the piston, exceeds a preset value. Also, both chambers communicate with each other through a shut-off valve, which hinders an excessive increase of the upper chamber pressure when the piston goes up.

Therefore, in the apparatus according to this invention, the lower chamber pressure increases and the differential pressure between the lower chamber pressure and the upper chamber pressure rapidly increases as the piston goes down from the upper limit due to the loading, and the die cushion capability corresponding to the preset differential pressure value is established.

Further, when the piston goes down, the differential pressure between the two chambers exceeds the preset value. Then, the check valve is opened, and the upper and the lower chambers are communicated with each other. Consequently, the lower chamber pressure is decreased, and the differential pressure is decreased to less than the preset value. At that time, the check valve is closed.

Thereafter, the opening and the closing of the check valve is repeated as the piston goes down, and the differential pressure between two chambers fluctuates within the narrow range of the proper blank holding pressure. The die cushion capability is maintained at a constant level until the piston reaches the lower limit.

On the other hand, when the slide goes up, the piston goes up from the lower limit to the upper limit by the differential pressure between two chambers. Then, the pressure in the upper chamber gradually increases, and when the pressures in both chambers are approximately equal to each other, the shut-off valve is opened, and the upper and the lower chambers are communicated with each other. As the result, the excessive increase of the upper chamber pressure is hindered, and the pressures in both chambers become equal to each other.

Under such conditions, the piston is pushed upward by the difference of the effective area due to the presence of the piston rod (sectional area), and the piston goes up relatively slowly.

Because residual pressure exists within the upper chamber, the piston goes up to the upper limit without generating a high impact force.

By establishing the proper timing to close the shut-off valve, it is possible to extensively increase the upper limit damper effect.

The apparatus according to the present invention is of such structure that, the upper and lower chambers of the cylinder are communicated with other through a check valve, that the check valve is opened when the differential pressure between two chambers reaches the preset differential pressure value, and the excessive increase of the upper chamber pressure is hindered by the shut-off valve when the piston goes up. Thus, the invention offers a small and compact pneumatic die cushion apparatus, which can eliminate the conventional large-size buffer tank, the high-pressure large-capacity compressor, the large-size quick-acting exhaust valve, and related components and which can maintain the die cushion capability at a constant level with a low operating cost.

Another object of this invention is to offer a pneumatic die cushion apparatus, by which it is possible to change and adjust the die cushion capability during press fabrication.

To attain these objects, the apparatus according to the present invention consists of a closed type cylinder unit, which is to replace the open-to-atmosphere type cylinder of conventional equipment. Based on the principle that the die cushion capability by the closed type cylinder is determined by the differential pressure between the lower chamber pressure and the upper chamber pressure, it is possible according to this apparatus to adjust the die cushion capability through the control of differential pressure during the press fabrication by communicating the lower and the upper chambers with each other.

Specifically, the apparatus according to this invention is characterized in that the lower and the upper chambers having a piston of the cylinder therebetween are communicated with each other through a first air passage equipped with a first shut-off valve and a second air passage equipped with a second shut-off valve, the first shut-off valve is constructed in such manner that it is opened when the differential pressure between the lower chamber pressure and the upper chamber pressure exceeds the preset differential pressure value inputted by the differential pressure setting means, a control member is provided to control the opening and the closing of the second shut-off valve when the piston goes up, a capability memorizing means to memorize two or more capability diagrams and a selection means to select one of the capability diagrams memorized by this capability memorizing means is provided, and the die cushion capability can be changed and adjusted during press fabrication by changing the preset differential pressure value outputted by the differential pressure setting means according to the capability diagram selected by the selection means.

Therefore, if the preset differential pressure value outputted by the differential pressure setting means is constant, the lower chamber pressure increases when the piston goes down from the upper limit due to the loading. Then, the differential pressure between the lower chamber pressure and the upper chamber pressure quickly increases, and the die cushion capability corresponding to the preset differential pressure value is thus established.

Further, when the piston goes down, the differential pressure between two chambers exceeds the preset differential pressure value. Then, the first shut-off valve serving as a check valve is opened, and the lower and the upper chambers are communicated with each other. Consequently, the lower chamber pressure is reduced, and the differential pressure goes down to below the preset differential pressure value. At the same time, the first shut-off valve is closed.

Thereafter, the opening and the closing of the first shut-off valve is repeated as the piston goes down, and the differential pressure between two chambers is changed within the narrow range of the tolerance of the necessary blank holding pressure. Thus, the die cushion capability can be substantially maintained at a constant level until the piston reaches the lower limit.

If a capability diagram is selected by the selection means from the capability diagrams memorized by the capability memorizing means, the preset differential pressure value inputted to the first shutoff valve by the differential pressure setting means corresponds to the capability diagram. Therefore, if the capability diagram is prepared in advance to "gradual increase", "gradual decrease", "stepwise increase or decrease", etc. for the press fabrication, the die cushion capability can be automatically changed and adjusted during the press fabrication.

On the other hand, when the slide begins to go up, the piston goes up from the lower limit to the upper limit by the differential pressure between two chambers. Accordingly, the upper chamber pressure is gradually increased, and when the pressures on two chambers become equal to each other, the second shut-off valve is opened by the control means and the upper and the lower chambers are communicated with each other. As the result, the excessive increase of the pressure in the upper chamber is avoided, and the pressures in two chambers are equalized.

Under such conditions, the piston is pushed upward by the effective area difference due to the presence of the piston rod (that is, by its cross-sectional area), and the piston goes up relatively slowly.

Because residual pressure exists in the upper chamber, the piston reaches the upper limit without generating a high impact force.

By establishing the proper timing to close the second shut-off valve, it is possible to extensively increase the effect for the upper limit damping.

The apparatus according to this invention is constructed in such manner that the upper and the lower chambers of the cylinder are communicated with each other through the first and the second air passages, the die cushion capability is adjusted through the control of differential pressure by the first shut-off valve, and the second shut-off valve is properly controlled when the piston goes up. Thus, the apparatus of this invention can be designed in a small and compact form, and it can eliminate the large-size buffer tank, the high-pressure large-capacity compressor, the quick-acting large-size exhaust valve, and related parts of the conventional type equipment. With low operating cost, the present apparatus can attain the proper die cushion capability accurately and quickly.

Moreover, the differential pressure is controlled according to the capability diagram memorized by the capability memorizing means. This makes it possible to change and adjust the die cushion capability during the press fabrication to suit the product to be fabricated, and this contributes to the production of a wide variety of the high quality products at higher efficiency.

In the figures, 1 refers to a cylinder, 1U an upper chamber, 1L a lower chamber, 2 a piston, 10 a check value, 11 a pipe, 20 a first shut-off valve, 21 a pipe, 30 a first air passage, 31 a pipe, 40 a first shut-off valve, 41 a main unit, 50 a second air passage, 51 a second shut-off valve, 60 and 70 a pressure regulating valve and a control unit respectively to form the differential pressure setting means, 71 a means to generate the capability signal, 72 a capability memorizing means, 73 a selection means, 74 a standard capability setter, 75 and 76 a controller and a pressure setter respectively to form the control means, and 77 and 78 a controller and a pressure setter respectively to form the initial pressure setting means.

DESCRIPTION OF THE PREFERRED EMBODIMENTS

Embodiment 1

Figure 1:
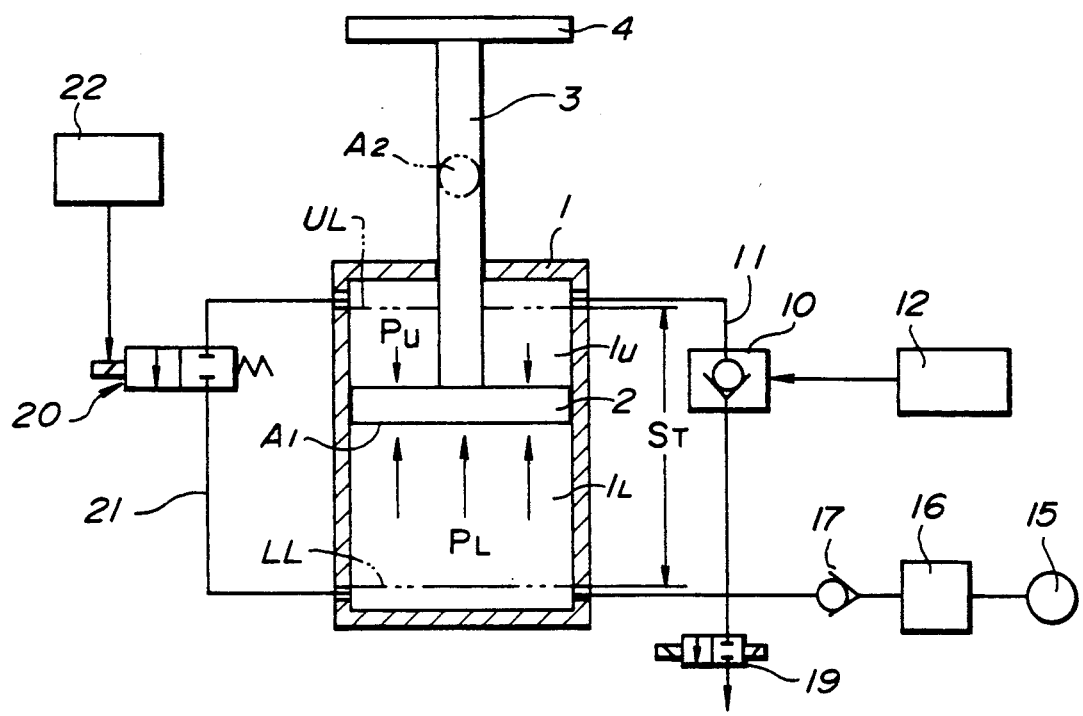
FIG. 1 is a general schematic view of a first embodiment of this invention.
Figure 2:
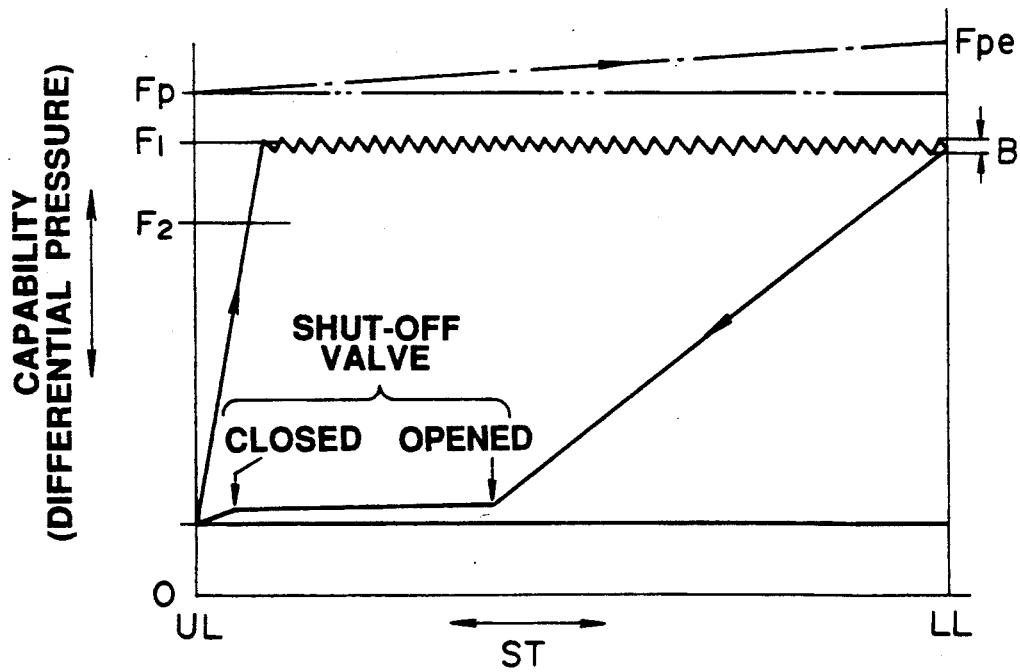
FIG. 2 is a graph to explain the operation of the preferred embodiment of FIG. 1 in comparison with the operation of conventional equipment.

FIG. 1 is a general schematic view of a preferred embodiment of this invention, and FIG. 2 is a diagram to explain the operation of the equipment. The same number or symbol is used to designate the same or comparable component as that of FIG. 7, which illustrates die cushion equipment of the conventional type.

As shown in FIG. 1, the die cushion apparatus of the first embodiment of this invention most basically includes cylinder unit (cylinder 1 and piston 2), a check valve 10, a shut-off valve 20, and additional components enumerated above.

To the cylinder unit, the compressed air is supplied from an air source 15 comprising a small compressor, a pressure regulating valve 16 and a check valve 17. In the initial condition where the piston 2 is at the upper limit UL, the initial pressure P1S is established in a lower chamber 1L, which is formed below the piston 2 of the cylinder 1. This initial pressure P1S is set by the pressure regulating valve 16. The movable stroke (ST) of the piston 2 is the upper limit UL and the lower limit LL in the cylinder 1. Reference number 1U represents the upper chamber formed above the piston 2.

Therefore, the die cushion capability of this equipment consisting of a closed cylinder unit is determined by the differential pressure between the lower chamber pressure Pl and the upper chamber pressure PU if the sectional area A2 of the piston rod 3 is neglected.

The check valve 10 is a means to communicate the lower chamber 1L with the upper chamber 1U, and it is opened when the differential pressure $\Delta(=Pl-Pu)$ between the lower chamber pressure Pl and the upper chamber pressure Pu, changing as the piston 2 goes down, reaches the preset differential pressure value $\Delta S$ (e.g. 3 kgf/cm$^2$). The check valve is installed in the middle of the pipe 11, connecting two chambers 1L and 1U.

The check valve 10 of this embodiment is constructed in such manner that the die cushion capability or force corresponding to the proper blank holding pressure can be changed and adjusted.

Specifically, when the setting signal is received from a differential pressure setter 12, the check valve 10 is opened when the differential value reaches the preset value $\Delta S$ (e.g. 2.8 kgf/cm$^2$, 3.0 kgf/cm$^2$, 3.2 kgf/cm$^2$, . . . ).

In addition, a the shut-off valve 20 is installed in the middle of a pipe 21, connecting the upper chamber 1U and the lower chamber 1L, and shut-off valve 20 functions to communicate the upper chamber 1U with the lower chamber 1L at an appropriate time. In other words, shut-off valve 20 prevents and excessive increase of the upper chamber pressure Pu when the piston 2 goes up; it is closed when the piston 2 goes down, and it is opened at the appropriate time when the piston goes up.

The excessive increase of the pressure as mentioned in the present invention is defined as the increase of the upper chamber pressure Pu to a value higher than the lower chamber pressure Pl or as the increase of the upper chamber pressure Pu to a value, at which the piston 2 is unable to go up, if the sectional area A2 of the piston rod 3 is taken into account.

Actually, the opening and closing of shut-off valve 20 are controlled by a control means 22. As shown in FIG. 2, the control means 22 of this embodiment is constructed in such manner that the opening signal is issued to the shut-off valve 20 when the piston 2 goes up from the lower limit LL with the lower chamber pressure P1 reduced and the upper chamber pressure Pu increased and the pressures in two chambers P1 and Pu become equal to each other (with the lower chamber pressure P1 slightly higher), and that the closing signal is issued immediately before the piston 2 reaches the upper limit UL.

The time to issue the opening signal can be determined by the ascending speed of the piston 2, and the signal may be issued at any point of the stroke (ST). It is also desirable to set the timing for the closing signal in such manner that a better upper limit damping effect can be obtained until the piston 2 can reach the upper limit UL.

Also, such timing can be defined by the present position of the piston 2 (e.g., by the position of piston rod 3) detected by a position detector 23. However, the timing may be defined by detecting the differential pressure between the lower chamber pressure P1 and the upper chamber pressure Pu or by detecting the axial angle of a crank.

The shut-off valve 20 and the control means 22 are not limited to the structures as described above. A pilot check valve may be provided to directly connect the upper chamber 1U with the lower chamber 1L, and the pipe 21 and the like may be omitted.

19 represents an exhaust valve to move the cushion downward.

In use, the operation of the first embodiment is as follows.

Suppose that the sectional area of the piston 2 is Al when the piston 2 is at the upper limit UL. Then, the die cushion capability F is determined by the following equation:

$$F = Pl \cdot Al - Pu \cdot (Al - A2)$$

As shown in FIG. 2, the upper chamber pressure Pu is supposed to be equal to the lower chamber pressure P1 at the upper limit UL in this embodiment, and the upward movement, i.e. the differential pressure $\Delta$ is based on the effective area difference due to the presence of the cross-sectional area A2 of piston rod 3.

Figure 7:
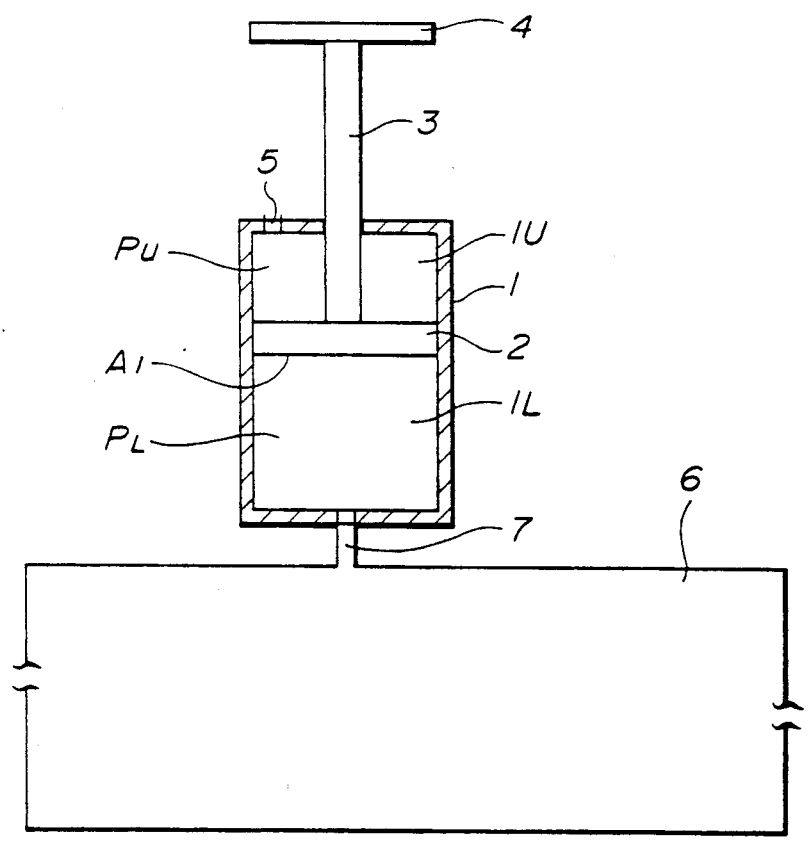
FIG. 7 is a general schematic view of PRIOR ART die cushion equipment.

In the structure of conventional equipment as shown in FIG. 7, the upper chamber 1U is open to the atmospheric air. Accordingly, the die cushion capability or force gradually increases as shown by the one-dot chain line of FIG. 2 and reaches Fpe at the lower limit LL. Thus, the predetermined die cushion capability Fp cannot be maintained at constant level. The blank holding pressure becomes too high by 20–25% at the lower limit LL.

If the differential pressure $\Delta S$ is set on the differential pressure setter 12 in advance to communicate the lower chamber 1L with the upper chamber 1U in this embodiment, the predetermined die cushion capability or force can be quickly obtained because the lower chamber pressure P1 is increased and the differential pressure $\Delta$ from the upper chamber pressure Pu is increased when the piston moves downward. When the differential pressure $\Delta$ becomes equal to the preset differential pressure value $\Delta S$, the check valve 10 is opened, connecting two chambers 1L and 1U with each other. As a result, the lower chamber pressure P1 decreases and the upper chamber pressure Pu increases. Then, the differential pressure $\Delta$ becomes smaller than the preset differential pressure $\Delta S$, and the check valve 10 is closed again. Thus, the check valve 10 repeatedly undergoes the opening and closing operation according to the differential pressure $\Delta$ until the piston 2 reaches the lower limit LL.

Therefore, the die cushion capability Fl is controlled within a band B of constant width even though there is slight change of differential pressure (as shown by the solid line zigzag in FIG. 2) according to the opening and closing operation of the check valve 10.

The width of the band B is defined as the allowable range of the proper blank holding pressure. The width of the band B can be selected by setting the bore diameter, flow resistance, and the like of the check valve 10 and the pipe 11, relative to the volume of the cylinder 1, to appropriate values.

Also, the die cushion capability can be varied according to the preset differential pressure value $\Delta S$ of the differential pressure setter 12. When it is set to the capability F2 as shown in FIG. 2, the preset differential pressure value $\Delta S$ should be set to a value lower than that of the capability F1.

On the other hand, the upward movement of the piston 2 from the lower limit LL depends upon the differential pressure $\Delta$ between the pressures P1 and Pu of two chambers and matches the upward movement of the slide in the initial stage. Then, it is performed smoothly in non-loaded status. As the lower chamber pressure P1 decreases and the upper chamber pressure Pu increases, the differential pressure $\Delta$ rapidly decreases.

Then, shut-off valve 20 is opened by the signal from the control means 22, and the two chambers 1U and 1L are connected with each other. Accordingly, the pressures P1 and Pu of two chambers become equal to each other, while the piston 2 moves further upward by the pushing force generated by the effective area difference due to the presence of the sectional area A2 of the piston rod 3.

This piston may be left to go up to the upper limit UL, whereas the shut-off valve 20 is closed again in this embodiment immediately before the upper limit UL. Therefore, the upper chamber pressure Pu becomes slightly higher and rapidly reduces the pushing force of the piston 2. Thus, the better damping effect can be obtained at the upper limit UL.

It is also effective that the shut-off valve 20 is opened and closed again momentarily when the piston 2 closely approaches the upper limit UL.

In the first embodiment, the lower chamber 1L and the upper chamber 1U are communicated with each other, and the communication is opened by the check valve 10 when the differential pressure between the pressures P1 and Pu of two chambers reaches the preset differential pressure $\Delta S$. Accordingly, the differential pressure between the upper chamber pressure Pu and the lower pressure P1 can be kept at constant level, and the die cushion capability can be maintained at a constant level during the press fabrication.

Because this embodiment is based on a closed construction where the upper chamber 1U and the lower chamber 1L are connected with each other through the check valve 10, the pipe 11, the shut-off valve 20, and the pipe 21, and where the air in the lower chamber 1L is released into the upper chamber 1U when the piston 2 goes down. Hence, there is no need to install the extra-large buffer tank 6 as in conventional equipment, and this provides conveniences and advantages in terms of operational economy, space requirements, and air consumption.

Because the die cushion capability can be adjusted by the cracking pressure (differential pressure) of the check valve 10, there is no need to install a high-pressure large-capacity compressor or large-size exhaust valve as in conventional equipment. This contributes to the compact design of the equipment and quick adjustment operation. Therefore, the production efficiency of the press can be raised with a shorter waiting time. More economic operation can be achieved because there is no need to release a large quantity of compressed air into the atmosphere.

Further, the upper chamber pressure Pu can be left unequal near the upper limit UL of the piston 2, i.e. residual pressure may be provided by setting the proper time to close the shut-off valve 20. This is helpful to extensively decrease the impact force at the upper limit UL.

Because the cracking pressure of the check valve 11 can be easily set and changed by the differential pressure setter 12, the necessary blank holding pressure can be quickly and accurately obtained. Moreover, the inconveniences such as bending of or other damage to the flange can be avoided because the blank holding pressure remains constant regardless of the downward movement of the piston 2. This contributes to the stable production of high-quality products.

Further, because the shut-off valve 20 is so constructed that its opening and closing are controlled properly by the control means 22, the return speed of the piston 2 to the upper limit UL, the upper limit damping effect, etc. can be set to the values as desired.

Embodiment 2

Figure 3:
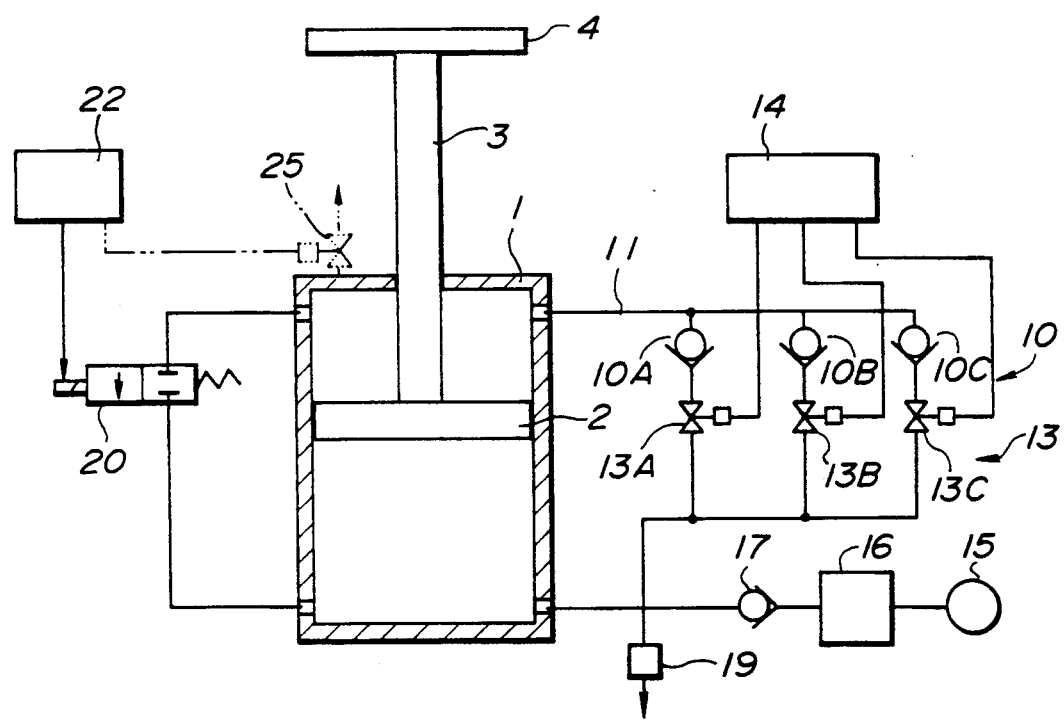
FIG. 3 is a general schematic view to show a second preferred embodiment of the invention.

In contrast to the embodiment of FIG. 1, in which the cracking pressure can be set and changed by the differential pressure setter 12 equipped with the check valve 10, the second preferred embodiment of FIG. 3 is constructed in such manner that the check valves 10 (10A, 10B and 10C) are installed in parallel as shown in FIG. 3, and that one check valve can be selected by the selection means 14 through changeover of the changeover switches 13 (13A, 13B and 13C) consisting of the corresponding electromagnetic valves. The other details are the same as the embodiment of FIG. 1, and the explanation is omitted.

Therefore, it is possible by this second embodiment to obtain the same operation and effect as the embodiment of FIG. 1, to set the die cushion capability more accurately because the cracking pressure of the check valve 10 is constant, and to perform the setting changeover more quickly because the changeover is carried out by simply opening or closing the changeover valve.

The embodiments described above consist of a complete closed type cylinder unit (cylinder 1 and piston 2), whereas an opening valve 25 may be provided to open the upper chamber 1U to atmospheric air at the proper time and temporarily as shown in FIG. 3 by two-dot chain line. For example, if it is opened by the control means 22 only for the moment when the piston 2 goes down from the upper limit UL, it is possible to perform the startup of the die cushion capability [F, (F2)] more quickly. Thus, it is possible to obtain and to promote the better effect and operation of the present invention.

Of course, in the special-purpose press with no need to change and adjust the die cushion capability, it is not necessary to change the check valve 10 to the cracking pressure variable type, and this invention is also applicable to such a case.

Embodiment 3

Figure 4:
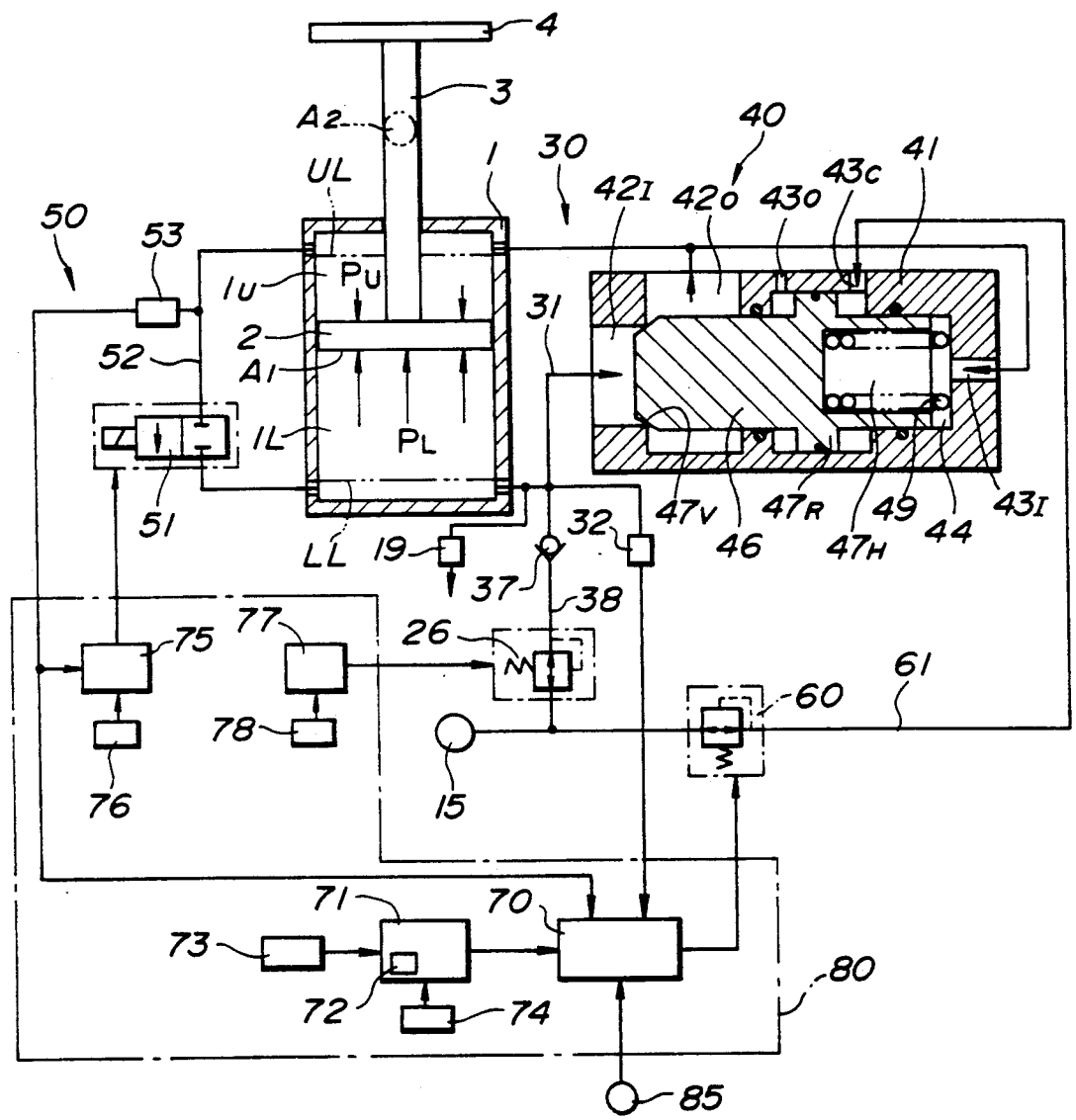
FIG. 4 is a general schematical view to show a third preferred embodiment of the invention.

Compared with the embodiments of FIGS. 1 and 3 which have constant die cushion capability during press fabrication, the die cushion capability is changeable and adjustable during press fabrication in the third embodiment of FIG. 4.

As shown in FIG. 4, this die cushion apparatus comprises a cylinder unit consisting of a cylinder 1, a piston 2, an initial pressure setting means, a differential pressure setting means, a capability memorizing means 72, a selection means 73 to control the first air passage 30 and a second air passage 50, and a control means to control the opening and the closing of the second air passage 50.

The cylinder unit consists of a cylinder 1, a piston 2, a piston rod 3, etc., and it has basically the same structure as the conventional apparatus of FIG. 7.

However, because one of the objects of the present invention is to eliminate the buffer tank 6 of conventional equipment, the conventional connecting pipe 7 is not installed in the lower chamber, and the upper chamber 1U is designed as a closed type without a conventional opening 5.

The initial pressure setting means is to set the pressure in the lower chamber 1L under the initial condition (with the piston 2 at upper limit UL), and it comprises a pressure regulating valve 36 of pressure variable type and a check valve 37 installed on the pipe 38 connecting an air source 15 consisting of a small compressor with the lower chamber 1L and a controller 77 to regulate the pressure regulating valve 36 according to the setting value of the pressure setter 78.

The first air passage 30 is to connect the lower chamber 1L with the upper chamber 1U of the cylinder 1 when the piston 2 goes down, and it consists of a pipe 31 connecting the two chambers 1L and 1U and of a first shut-off valve 40 installed in the middle of this pipe 31 and serving as a check valve. The cracking pressure as the check valve function is controlled by the preset differential pressure value inputted from the differential pressure setting means (60 and 70).

It opens when the differential pressure between the lower chamber pressure P1 and the upper chamber pressure Pu exceeds the preset differential pressure value.

Here, the first shut-off valve 40 consists of a hollow cylindrical main unit 41 and a cylindrical valve disc 46 slidably inserted in the main unit 41, and it is closed at all times.

At the front end of the main unit 41, an inlet 42I and an outlet 42O are provided to connect with the pipe 31, and an inlet 43I is furnished on the rear end to apply the upper chamber pressure Pu through the pipe 31.

On the other hand, a spring is mounted in the hollow portion 47H at the rear end of the valve disc 46, and a valve unit 47V is provided on the front end to close the inlet 42I.

Consequently, when the lower chamber pressure P1 is increased, the valve disc 46 is moved rightward in FIG. 4 against the resilient force of the spring 49, and the lower chamber 1L and the upper chamber 1U of the cylinder 1 are connected with each other through the inlet 42I and the outlet 42O.

Also, when the air is released from the lower chamber 1L, the lower chamber pressure P1 is reduced, and the valve 40 is closed again by the resilient force of the spring 49.

In this case, the cracking pressure serving as a check valve to the first shut-off valve 40 is determined primarily by the resilient force of the spring 49.

In the meantime, the first shut-off valve 40 of this invention is characterized in that the cracking pressure is variable. For this reason, compressed air is supplied from the inlet 43C furnished in the middle of the main unit 41. The compressed air serving as a control signal is to increase the cracking pressure in addition to the resilient force of the spring 49. In other words, minimum cracking pressure is determined by the spring 49, and the higher cracking pressure is determined by the pressure of the air supplied to the inlet 43C. The outlet 42O and the inlet 43I are communicated with each other to keep the balance. Also, 43O is opened to the atmospheric air.

Here, the differential pressure setting means is a means to set the cracking pressure of the first shut-off valve 40 and is to set the pressure of the air supplied to the inlet 43C of the first shut-off valve 40. Specifically, it includes of a pressure regulating valve 60 serving as an electropneumatic converter installed on the pipe 61, which connects the inlet 43C of the valve 40 with the air source 15, and a control unit 70. The control unit 70 and the associated elements are accommodated in the control panel 80 together with the other controllers (75) and the like.

The control unit 70 in this third embodiment of FIG. 4 uses the lower chamber pressure P1 from the pressure detector 32, the upper chamber pressure Pu from the pressure detector 53 and the crank axial angle from the angle detector 85 as input data. It issues the electric signal to control the pressure regulating valve 60 so that the differential pressure obtained by the comparative computation of the lower chamber pressure P1 and the upper chamber pressure Pu becomes equal to the differential pressure corresponding to the capability signal. In other words, it is to control the cracking pressure of the first shut-off valve 40 by a closed loop.

This capability signal is outputted from the capability signal generating means 71. The capability signal generating means 71 is to determine the die cushion capability to obtain the necessary blank holding pressure during press fabrication in relation to the stroke of the piston 2, and a capability memorizing means 72 to memorize two or more capability diagrams, i.e. the die cushion capability - piston stroke curve is included in it. The capability diagram is as shown by the curves (2)–(5) in FIG. 6, and the capability is changed during the change of the piston stroke, i.e. during press fabrication. For wider application, the curve (1) is also memorized, in which the capability is at constant level as in the cases of the embodiments 1 and 2.

The selection of the curve from the capability diagram is carried out by the selection changeover means 73.

Figure 6:
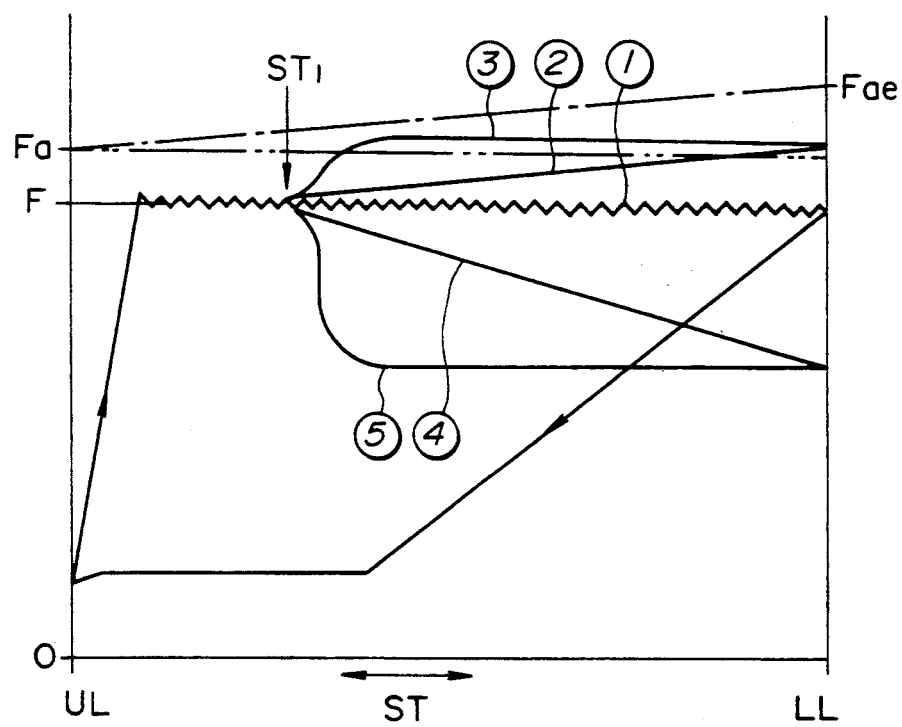
FIG. 6 is a graph to explain the operation of the third and the fourth embodiments of FIGS. 4 and 5, respectively, in comparison with the operation of conventional die cushion equipment.

Further, the capability signal generating means 71 in this third embodiment is designed in such manner that the capability signal for the quick rising up to the standard capability F as set by the standard capability setter 74 until the piston stroke ST1 as shown in FIG. 6 is reached.

Of course, the diagram specifying from the upper limit UL to the lower limit LL and from the lower limit LL to the upper limit UL may be memorized by the capability signal generating means 71 and the capability signal generating means 71 may issue the capability signal corresponding to the diagram selected by the selection means 73 to the control unit 70. In this case, the standard capability setter 74 can be omitted. (See the embodiment 4.)

The piston stroke is to be determined by the axial angle of the crank inputted from the angle detector 85. Because the capability memorizing means 72 consists of reloadable ROM (read-only memory) the capability diagram can be changed, added or deleted as appropriate.

Next, the second air passage 50 is to connect the upper chamber 1U with the lower chamber 1L at appropriate time during the upward movement of the piston 2, and it is composed of a pipe 52 to connect two chambers 1U and 1L and of a second shut-off valve 51 consisting of an electromagnetic valve.

The control means to control the opening and the closing of the second shut-off valve 51 consists of a pressure setter 76 and a controller 75. The controller 75 issues the signal to excite the solenoid when the upper chamber pressure Pu detected by the pressure detector 53 is equal to the setting value of the setter 76. When the solenoid is excited, the second shut-off valve 51 is opened. Also, the controller 75 turns off the signal when the piston 2 closely approaches the upper limit UL and closes the second shut-off valve 51 again.

The differential pressure setter may be provided instead of the pressure setter 76, and the lower chamber pressure P1 may be inputted to the controller 75 so that the opening and the closing of the second shut-off valve 51 can be controlled according to the differential pressure between the pressures P1 and Pu of two chambers.

19 represents an exhaust valve to move the cushion downward, and 37 a check valve.

In the third embodiment with the structure as described above, the operation is performed as follows:

First, the initial pressure in the lower chamber 1L is set by the pressure setter 78. Next, the standard capacity F to be determined up to the piston stroke ST1 is set by the standard capability setter 74, and the curve, in which the capability after the stroke ST1 matches the forms of the products, is selected by the selection means 73. (e.g. the curve (5) of FIG. 6) Also, the upper chamber pressure Pu to close the second shut-off valve 51 is set by the pressure setter 76.

In FIG. 6, the curves (2)–(5) are more simplified than the curve (1) indicating the average capability only), and the process during the upward movement of the piston is not shown because it is easily imaginable from a consideration of the curve (1).

The die cushion capability F is determined by the following equation:

$$F = P1 \cdot A - Pu \cdot (A1 - A2)$$

Because the upper chamber 1U is open to the atmospheric air in the conventional structure as shown in FIG. 7, the predetermined capability Fa is determined as soon as the piston rod 3 moves down. Then, the die cushion capability gradually increases up to Fae at the lower limit LL as shown by the one-dot chain line of FIG. 6. Because the volume of the buffer tank 6 is 5-8 times more than that of the cylinder, it is not possible to maintain the die cushion capability Fa at a constant value. At the lower limit LL, the blank holding pressure becomes excessive by 20-25%.

When the piston 2 moves down from the upper limit UL in the third embodiment, the lower chamber pressure P1 increases, and the differential pressure from the upper chamber pressure Pu increases. Thus, the standard capability F can be generated quickly. The higher the initial pressure in the lower chamber 1L is, the quicker the startup is.

When the piston 2 tends to go down after the standard capability F is established, the control unit 70 including the differential pressure setting means controls the pressure regulating valve 60 in such a manner that the differential pressure obtained from the input given by the pressure detectors 32 and 53 becomes equal to the differential pressure value corresponding to the capability signal issued from the capability signal generating means 71. This determines the cracking pressure, and the first shut-off valve 40 is opened by this cracking pressure. Then, the lower chamber 1L is connected with the upper chamber 1U. The lower chamber pressure P1 decreases and the first shut-off valve 40 closes again.

Therefore, the differential pressure changes, repeating the slight fluctuation within the allowable range of the necessary blank holding pressure. The standard capability F can be substantially maintained up to the stroke ST1.

If the curve (1) of FIG. 6 is selected by the selection means 73, the capability signal generating means 71 reads the curve (1) from the diagrams memorized in the capability diagram memorizing means 72 and issues this to the control unit 70. In this case, the first shut-off valve 40 is controlled by the differential pressure setting means (60 and 70) in such manner that the capability F can be maintained at the constant level until the piston 2 reaches the lower limit LL.

If the curve (5) is selected, for example, the control unit 70 controls the pressure regulating valve 60 to change the die cushion according to the curve (5) based on the input from the capability signal generating means 71, the input from both pressure detectors 32 and 53, and the input from the angle detector 33. Thus, the opening and the closing of the first shut-off valve 40 are controlled. The die cushion capability is decreased stepwise after the piston stroke passed ST1 during press fabrication, and it is maintained at constant level until the piston reaches the lower limit LL.

In case of the curve (4), it gradually decreases, whereas in case of the curve (2), it gradually increases.

On the other hand, the upward movement of the piston 2 from the lower limit LL matches initially the upward movement of the slide according to the differential pressure between the pressures P1 and Pu in two chambers, and the piston moves smoothly upward thereafter in non-loaded status. Because the lower chamber pressure P1 decreases and the upper chamber pressure Pu increases, the differential pressure rapidly decreases.

When the upper chamber pressure Pu exceeds the preset value determined by the pressure setter 76, the second shut-off valve 51 is opened by the signal of the controller 75, and two chambers 1U and 1L are connected with each other. Accordingly, the pressures P1 and Pu in two chambers become equal to each other, whereas the piston 2 moves further upward by the pushing force generated by the effective area difference due to the presence of the sectional area A2 of the piston rod 3.

The piston may be left to reach the upper limit UL, while, in this embodiment, the second shut-off valve 51 is closed again immediately before the upper limit UL. Because the upper chamber pressure Pu slightly increases and reduces the pushing force of the piston 2, the damping effect at the upper limit UL can be extensively increased.

It is also effective to open and close the shut-off valve 51 again momentarily when the piston 2 closely approaches the upper limit UL.

In the embodiment 3, the first and second air passages 30 and 50 are provided to connect the upper chamber 1U with the lower chamber 1L of the cylinder 1. When the piston goes down, the opening and the closing of the first air passage 30 (the first shut-off valve 40) are adjusted to control the differential pressure between the lower chamber pressure P1 and the upper chamber pressure Pu. When the piston goes up, the opening and the closing of the second air passage 50 (the second shut-off valve 51) are adjusted to hinder the excessive increase of the upper chamber pressure Pu. Consequently, there is no need to install extra-large buffer tank (6), and it provides many advantages in terms of operation economy, space requirements and air consumption.

Also, the first shut-off valve 40 having the function of a check valve is included in the first air passage 30, and the setting of the cracking pressure is changed by the differential pressure setting means (60 and 70) in the first shut-off valve 40. Moreover, the differential pressure setting means (60 and 70) controls the first shut-off valve 40 according to the capability signal issued from the capability signal generating means 71 specified by the selection means 73 and the capability memorizing means 72. Thus, the die cushion capability can be changed during the press fabrication, and a wide variety of the products can be produced efficiently. Also, the material cost can be reduced, and there is no restriction on the forms of the material to be used. The start-up and the stopping of the operation can be quickly adjusted.

The cylinder units (1, 2) are designed as closed type units, and the die cushion capability is determined by connecting or separating two chambers 1U and 1L through the control of the first air passage 30 and the second air passage 50. This contributes to the elimination of the high-pressure large-capacity compressor or the quick-acting large-size exhaust valve as seen in conventional equipment, and a compact and economical apparatus can be obtained. To adjust the die cushion capability, only the setting of the cracking pressure of the first shut-off valve 40 should be changed. This means quick and accurate operation as well as a shorter waiting time and higher production efficiency of the press. Moreover, the quantity of the air released for the adjustment of die cushion capability is very low, in principle, and it is very advantageous for economical operation.

Further, the upper chamber pressure Pu can be left unused when the piston approaches the upper limit UL; i.e., the differential pressure can be reduced by choosing the closing time of the second shut-off valve 51 appropriately. This is helpful to extensively decrease the impact force at the upper limit UL.

Embodiment 4

Figure 5:
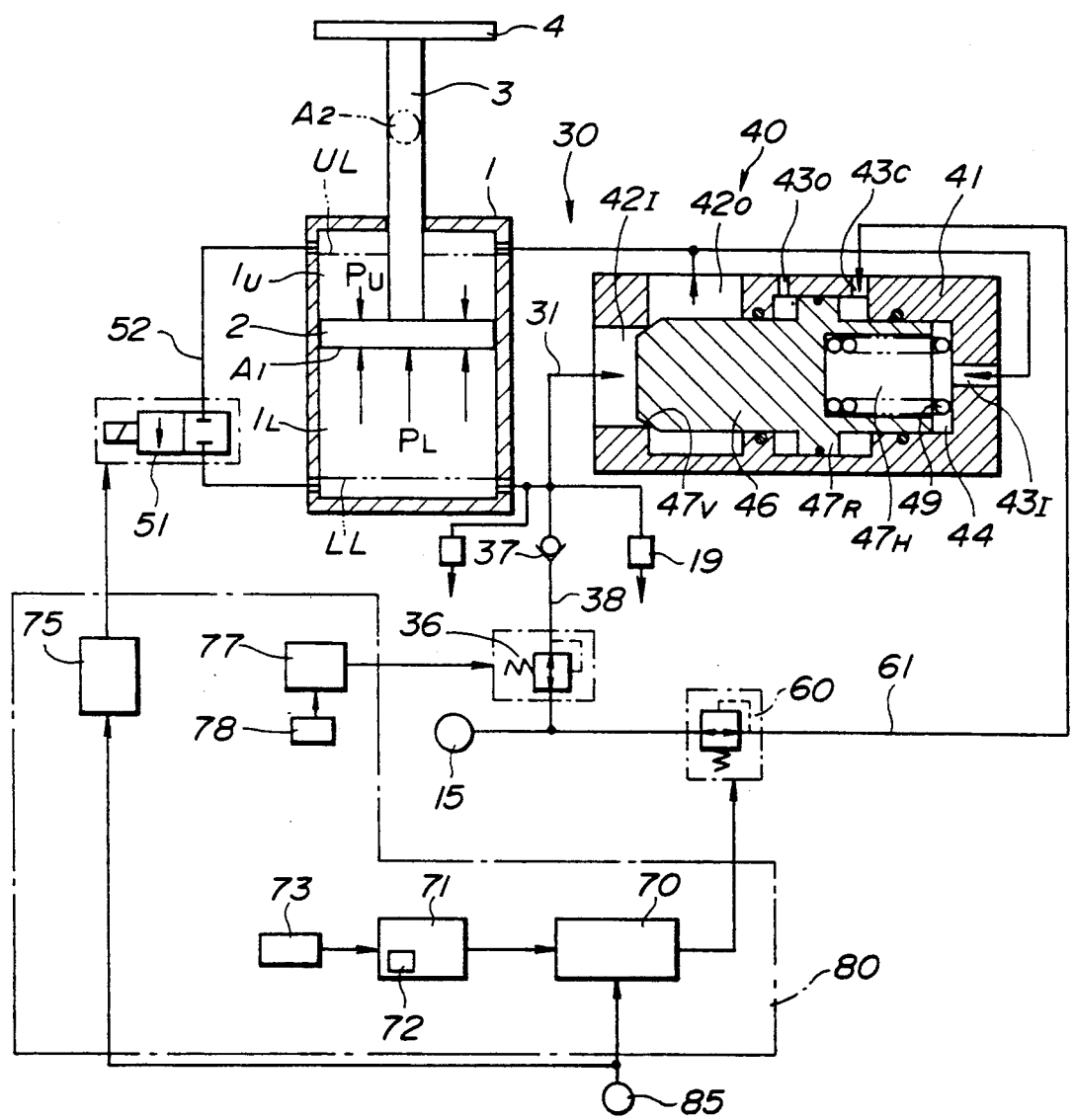
FIG. 5 is a general schematical view to show a fourth preferred embodiment.

The fourth embodiment is shown in FIG. 5.

The fourth embodiment has more simplified components and facilities than the third embodiment.

Specifically, when the forms and the characteristics of the cylinder unit (1, 2), the first shut-off valve 40 and the second shut-off valve 51 are determined, the lower chamber pressure P1, the upper chamber pressure Pu and the differential pressure between the pressures P1 and Pu of two chambers during the upward and the downward movement of the piston 2 as well as the relation between the upward and the downward movement of the slide and the necessary blank holding pressure can be made clear if the type of the press and the products to be fabricated are specified. Therefore, the differential pressure is controlled by the first shut-off valve 40, whereas the pressures in two chambers and the differential pressure are not directly detected and these are substituted for by the axial angle of the crank.

Therefore, the pressure detectors 32 and 53 in the third embodiment of FIG. 4 are not included.

Also, the standard capability setter 74 is not provided, and the die cushion capability for all strokes of the piston 2 from the upper limit UL to the lower limit LL is memorized by the capability diagram memorizing means 72. Thus, the control unit 70 controls the pressure regulating valve 60 by specifying the capability signal, inputted from the capability signal generating means 71, by the crank axial angle from the angle detector 85, and the cracking pressure of the first shut-off valve 40 is set. That is, the embodiment 3 forms a closed loop, while the embodiment 4 forms an open loop with one curve read from the capability diagram memorizing means 72 as the preset value.

Further, the control means to control the opening and the closing of the second shut-off valve 51 includes the controller 75, which is a program sequencer. Controller 75 controls the opening and the closing of the second shut-off valve 51 in relation to the crank axial angle according to a predetermined procedure during the upward movement of the piston 2. However, the opening and the closing are controlled in their timing similar to control in the third embodiment. The opening and closing procedure as well as the timing can be changed.

It is also possible in the case of the fourth embodiment to obtain the same effect as the third embodiment by using the crank axial angle as an input, (i.e. the effects such as the elimination of large size buffer tank, high-pressure large-capacity compressor, quick-acting large-size exhaust valve, and the adjustment and alteration of the die cushion capability during press fabrication).

Moreover, compared with the third embodiment, this fourth embodiment can provide a more simplified structure and lower cost by omitting two pressure detectors (32 and 53) and by simplifying the control unit 70.

Because each operation is determined not as the differential pressure between the pressures P1 and Pu in two chambers but is indirectly determined by the crank axial angle, the automatic adjustment of the die cushion capability can be freely, easily and simply performed during press fabrication if the capability diagram to be memorized by the capability memorizing means 72 is clearly defined.

In the third and fourth embodiments, the control unit 70, the capability signal generating means 71, the capability memorizing means 72, and the controllers 75 and 77 are furnished separately, whereas these means may be organically and integrally incorporated by a computer consisting of a CPU (central processing unit), with the necessary RAM (random-access memory), ROM (read-only memory), and the like.

What is claimed is:

1. A pneumatic die cushion apparatus, comprising:
    a first and a second shut-off valve;
    a cylinder having a piston movable upwardly and downwardly therein, and upper and lower chambers in said cylinder respectively above and below said piston, and said upper and lower chambers communicating with each other by a first air passage through said first shut-off valve and communicating with each other by a second air passage through said second shut-off valve;
    a differential pressure setting means for establishing and outputting a preset differential pressure value established by the difference between the pressure in the upper chamber and the pressure in the lower chamber;
    means for operating said first shut-off valve when the difference between the lower chamber pressure and the upper chamber pressure exceeds the present differential pressure value inputted from the differential pressure setting means;
    a control means for controlling the operating of opening and closing of said second shut-off valve at a predetermined time when said piston goes up; and
    a capability diagram memorizing means for memorizing at least two capability diagrams and including a selection means for selecting one of said at least two capability digrams memorized by said capability diagram memorizing means,
    wherein the preset differential pressure value issued from the differential pressure setting means is changed according to the one of said at least two capability diagrams selected by the selection means to change and adjust a die cushion capability during press operation.

2. A pneumatic die cushion apparatus as set forth in claim 1, wherein said first shut-off valve includes a hollow main unit having an inlet connected to the lower chamber of the cylinder and an outlet connected to the upper chamber, and said first shut-off valve includes a valve disc slidably engaged on said hollow main unit, and spring means for causing said valve disc to normally close said inlet and to establish the minimum cracking pressure, and a pneumatic means for supplying air pressure to determine and to vary a higher cracking pressure.

3. A pneumatic die cushion apparatus as set forth in claim 2, further comprising a pressure setter for setting a value and a pressure detector for detecting the upper chamber pressure, and wherein said control means opens said second shut-off valve when the value set by the pressure setter becomes equal to the upper chamber pressure of said cylinder detected by the pressure detector.

4. A pneumatic die cushion apparatus as set forth in claim 2, wherein said control means includes said second shut-off valve connecting said upper chamber with said lower chamber, and a program sequencer.

5. A pneumatic die cushion apparatus as set forth in claim 4, wherein said differential pressure setting means includes a pressure regulating valve provided between said pneumatic means and said first shut-off valve, and a control unit is provided to issue an electric signal for controlling said pressure regulating valve.

6. A pneumatic die cushion apparatus as set forth in claim 5, further comprising an angle detector for detecting a crank angle corresponding to a stroke of said piston and generating an electrical signal corresponding thereto, and wherein said control unit includes said capability diagram memorizing means to memorize a die cushion capability defined for all strokes of said piston and issues the electric signal for control of the output signals from the capability signal generating means to the pressure regulating valve, the electric signal corresponding to the stroke for the crank angle detected by the angle detector.

7. A pneumatic die cushion apparatus as set forth in claim 5, further comprising a capability signal generating means for inputting a die cushion capability to said control unit, and wherein said control unit issues the electric signal for causing the difference in pressure between the lower chamber pressure and the upper chamber pressure of said cylinder to be equalized to the differential pressure corresponding to the die cushion capability inputted by said capability signal generating means.

8. A pneumatic die cushion apparatus as set forth in claim 7, wherein said capability signal generating means includes said capability diagram memorizing means and issues the capability signal as a function of the capability diagram selected by said selection means.

9. A pneumatic die cushion apparatus as set forth in claim 8, further comprising a standard capability setter for setting a standard capability, and wherein said capability signal generating means comprises means for generating the capability signal for rapid startup up to the standard capability as set by said standard capability setter until said piston reaches a predetermined stroke.

10. A pneumatic die cushion apparatus, comprising;
a cylinder having a piston therein, said piston being movable upwardly and downwardly from an upper limit to a lower limit, and said piston defining upper and lower chambers;
a check valve fluidly connecting said upper and lower chambers;
means for operating said check valve when a differential pressure between the pressure in the lower chamber and the pressure in the upper chamber, which changes with the downward movement of the piston, exceeds a predetermined differential pressure value, and for controlling the differential pressure from a time when the differential pressure exceeds said predetermined differential pressure value until said piston reaches said lower limit, during a latter portion of the downward movement of said piston; and
shut-off valve means for providing fluid communication between said upper and lower chambers to establish a predetermined pressure in said upper chamber and to hinder an excessive increase of pressure in said upper chamber when said piston moves upwardly.

11. A pneumatic die cushion apparatus as set forth in claim 10, wherein said means for operating said check valve maintains the differential pressure substantially constant during the latter portion of the downward movement of said piston.

12. A pneumatic die cushion apparatus as set forth in claim 10, wherein said means for operating said check valve includes means for alternately opening and closing said check valve for maintaining the differential pressure substantially constant during the latter portion of the downward movement of the piston.

13. A pneumatic die cushion for cushioning a downward force exerted by a press, comprising:
a hollow cylinder having an upper end and a lower end, the upper end of the cylinder having an aperture;
a piston in the cylinder, the piston dividing the interior of the cylinder into an upper chamber and a lower chamber, the piston being movable between an upper limit adjacent the upper end of the cylinder and a lower limit adjacent the lower end of the cylinder;
a piston rod connected to the piston and extending through the aperture n the upper end of the cylinder, the piston rod receiving the downward force exerted by the press;
first means for exerting an approximately constant retarding force on the piston rod as the downward force exerted on the piston rod moves the piston from a position adjacent the upper limit to a position adjacent the lower limit, the first means communicating between the upper and lower chambers and including a check valve, and means for repeatedly opening the check valve when the pressure in the lower chamber exceeds the pressure in the upper chamber by a predetermined differential pressure value; and
second means for limiting the pressure in the upper chamber as the piston moves from the lower limit to the upper limit, the second means communicating between the upper and lower chambers and including a shut-off valve, and means for opening the shut-off valve when the piston has moved from the lower limit to a predetermined position between the upper and lower limits.

14. A pneumatic die cushion apparatus, comprising:
a check valve;
a cylinder having a piston movable upwardly and downwardly therein, and upper and lower chambers in the cylinder respectively above and below said piston, and said upper and lower chambers communicating with each other through said check valve;
means for operating said check valve during a downward movement of said piston when the difference between the pressure in said lower chamber and the pressure in said upper chamber, which changes with the downward movement of the piston, exceeds a preset differential pressure value, said means for operating said check valve comprising a differential pressure setter, said check valve being opened or closed by a setting signal of the differential pressure setter, the differential pressure setter including means for changing the preset differential pressure value;
shut-off valve providing communication between said upper and lower chambers; and
means for operating said shut-off valve to hinder an excessive increase of the pressure in said upper chamber when the piston goes up.

15. A pneumatic die cushion apparatus, comprising:
a check valve;
a cylinder having a piston movable upwardly and downwardly therein, and upper and lower chambers in the cylinder respectively above and below said piston, and said upper and lower chambers communicating with each other through said check valve;

means for operating said check valve during a downward movement of said piston when the difference between the pressure in said lower chamber and the pressure in said upper chamber, which changes with the downward movement of the piston, exceeds a preset differential pressure value;

a shut-off valve providing communication between said upper and lower chambers; and means for operating said shut-off valve to hinder an excessive increase of the pressure in said upper chamber when the piston goes up, said means for operating said shut-off valve comprising control means for generating an opening signal and a closing signal, said shut-off valve being opened by the opening signal of said control means and closed by the closing signal of said control means.

16. A pneumatic die cushion apparatus as set forth in claim 15, wherein said control means issues the opening or the closing signal when one of said piston and said piston rod comes to a predetermined position.

17. A pneumatic die cushion apparatus, comprising:
a check valve;

a cylinder having a piston movable upwardly and downwardly therein, and upper and lower chambers in the cylinder respectively above and below said piston, and said upper and lower chambers communicating with each other through said check valve;

means for operating said check valve during a downward movement of said piston when the difference between the pressure in said lower chamber and the pressure in said upper chamber, which changes with the downward movement of the piston, exceeds a preset differential pressure value;

a shut-off valve providing communication between said upper and lower chamber; and means for operating said shut-off valve to hinder an excessive increase of the pressure in said upper chamber when the piston goes up, said means for operating said shut-off valve comprising a control means for controlling said shut-off valve, said shut-off valve and said control means being integrally incorporated in a pilot check valve, and said pilot check valve directly communicates said upper chamber with said lower chamber of said cylinder.

18. A pneumatic die cushion apparatus, comprising:
at least two check valves, each having a different operating pressure;

a cylinder having a piston movable upwardly and downwardly therein, and upper and lower chambers in the cylinder respectively above and below said piston, and said upper and lower chambers communicating with each other through said at least two check valves;

means for selecting one of said at least two check valves and operating the selected check valve during a downward movement of said piston when the difference between the pressure in said lower chamber and the pressure in said upper chamber, which changes with the downward movement of the piston, exceeds the operating pressure of the selected check valve;

a shut-off valve providing communication between said upper and lower chambers; and means for operating said shut-off valve to hinder an excessive increase of the pressure in said upper chamber when the piston goes up.

* * * * *